United States Patent [19]
Klassen

[11] Patent Number: 5,867,906
[45] Date of Patent: Feb. 9, 1999

[54] BUSHING CONSTRUCTION FOR PRECISION-FIT PIVOT ASSEMBLIES

[75] Inventor: James B. Klassen, Calgary, Canada

[73] Assignee: Outland Sports, Inc., Alberta, Canada

[21] Appl. No.: 778,901

[22] Filed: Jan. 3, 1997

Related U.S. Application Data

[60] Provisional application No. 60/009,594 Jan. 4, 1996.

[51] Int. Cl.$^6$ ................................................. B23P 15/00
[52] U.S. Cl. ........................ 29/898.07; 29/434; 29/898.1
[58] Field of Search ........................ 29/898.07, 898.09, 29/898.1, 898.054, 434; 384/463

[56] References Cited

U.S. PATENT DOCUMENTS

| | | | |
|---|---|---|---|
| 1,676,171 | 7/1928 | Valentine | 29/898.054 |
| 2,168,227 | 8/1939 | Lignian | 29/434 |
| 3,127,224 | 3/1964 | Owens et al. | 29/898.09 |
| 3,155,439 | 11/1964 | Guzewicz | 29/898.1 |
| 5,743,015 | 4/1998 | Kunze et al. | 29/898.07 |

*Primary Examiner*—Carl E. Hall
*Assistant Examiner*—Christopher Goins
*Attorney, Agent, or Firm*—Todd N. Hathaway

[57] ABSTRACT

A pivot assembly formed by driving an oversized pivot shaft through first and second self-lubricating flanged bushings. The bushing in the static part of the assembly has a smaller inside diameter than the bushing in the rotating part. Installation of the shaft removes a substantial portion of the wear layer on the first bushing so as to form a tight, non-rotating fit therewith, and a lesser portion of the wear layer on the second bushing so as to form a tight, rotating fit therewith.

3 Claims, 4 Drawing Sheets

5,867,906

BUSHING CONSTRUCTION FOR PRECISION-FIT PIVOT ASSEMBLIES

This application is a Provisional application No. 60/009,594, dated Jan. 4, 1996.

The present invention relates generally to bearing/bushing assemblies, and, more particularly, to a preload bushing assembly formed by partial removal material from a self-lubricating flanged bushing.

BACKGROUND OF THE INVENTION

"Preload" is often employed to eliminate unwanted play in bearing systems: For example, preload may be used to eliminate excessive motion from a vehicle suspension system. However, achieving the desired preload in conventional bushing/bearing pivot systems ordinarily calls for extremely high tolerance machining of the components and/or threaded assemblies, which adds significantly to the cost of fabrication and assembly.

Another problem with conventional shaft pivot designs is providing a simple but secure manner for anchoring the pivot shaft to the housing so as to eliminate unwanted rotation of the shaft; for example, the common practice of resorting to a keyed construction adds considerably to the cost and complexity of the assembly. Yet another disadvantage of conventional shaft-pivot designs is the exterior press-fit which is required to hold the bearings and/or bushings in place.

SUMMARY OF THE INVENTION

The present invention has solved the problems cited above, and provides a pivot system having the following benefits: (a) low sliding friction; (b) little or no play during use; (c) ease of assembly and servicing; (d) ease of sealing without requiring special machining; (e) self retention of the pivot shaft; (f) reduced tolerance necessary on bore sizes and shaft diameters; and (g) simplified machining of bore holes (no counter-bores or bushing retention machining required).

DETAILED DESCRIPTION a. Overview

As will be described in greater detail below, the bushing system of the present invention uses special, self-lubricating flanged bushings, such as Garlock DU bushings (Garlock, Inc., 1666 Division St., Palmyra, N.Y.) or INA Permaglide bushings (INA Bearing Co. Ltd., 2200 Vauxhall Place, Richmond, BC), for example.

Instead of relying on a close-tolerance machined fit between the shaft and housing, a "stator bushing" is used at each pivot to hold the pivot shaft in place. The permanently lubricated lining of the bushing is softer than the shaft material, and the stator bushing is undersized so that some of the lining material will be compressed and/or removed by the leading end of the pivot shaft as this is pressed into place. This provides a replaceable seat for the shaft which does not require the same precision machining as would an ordinary metal-to-metal fit, and which will not develop any play so long as the static load on the stator bushing does not exceed its capability. The bore of the stator bushing has a diameter which is enough smaller than that of the pivot pin that a substantial portion, and preferably most or all of the soft permanently lubricated layer will be displaced as the pin is driven home.

The other bushing at each pivot is referred to as the "dynamic bushing". The bore of this bushing is larger than that of the "stator bushing", so as to ensure a lesser degree of friction between this bushing and pivot shaft as compared with the stator bushing. This permits the rotating part of the assembly to turn on the shaft while preventing the pivot shaft from turning inside the stator bushing. The inside diameter of the rotor bushing is, however, still smaller than the diameter of the shaft, so that the preload is established by a lesser degree of deformation/displacement of the layer of permanently lubricated material. Thus, the thickness of the permanently lubricated lining in the bushings provides a "slop factor" which permits the desired preload to be achieved without precise machining of the parts. While it is preferable that the diameter of the pivot shaft exceed that of the stator bushing bore by an amount about equal to the thickness of the lining so that most or all of the latter is removed upon installation from shaft, the main consideration is that (assuming equal wear layer thicknesses) the inside diameter of the installed stator bushing be smaller than that of the rotor bushing, and that the diameter of the pivot shaft be larger than both of these but not so large as to completely remove the wear layer from the rotor bushing.

Figure 9A:
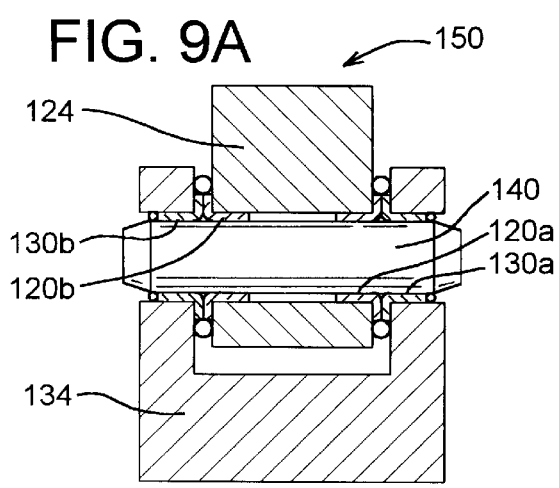
FIG. 9A is a cross-sectional view of the complete bushing assembly constructed as shown in FIGS. 3–8.

Sealing of the pivot assembly can easily be accomplished by the use of O-rings or other ring-type seals, as shown in FIG. 9A. By designing the bore hole to be shorter than the sleeve portion of the bushing, seals can be installed at the end of the bushing sleeve with no extra machining being required for O-ring grooves. Likewise, the faces of the rotating and static parts may be machined with a larger diameter than the flange portions of the bushings, so as to provide contact faces for the circumferential seal without requiring additional machining of seal grooves.

Ideally, the bores are sized to allow simple insertion and removal of the bushings by hand; this may require using bore sizes which are larger than those suggested by the bushing manufacturer. Insertion of the shaft, in turn, requires much greater force, and may be done with an arbor press, C-clamp, or hammer. If Permaglide-type bushings are used, the shaft should preferably be larger than the ID of the bushing so as to prevent play from developing as the bushings wear. The lead end of the shaft is preferably tapered to keep the shaft centered as it is assembled, and to prevent removal of too much material from the ID of the bushings.

b. Flanged Bushings

Figure 1:
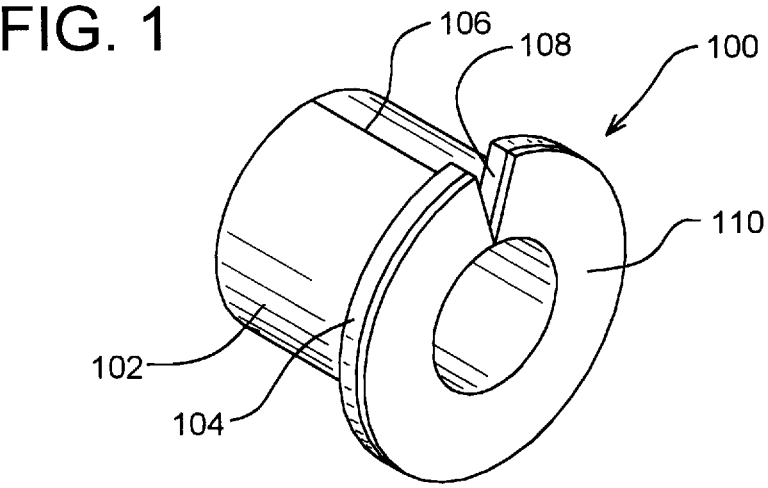
FIG. 1 is a perspective view of a self-lubricating flanged bushing which is employed in the construction of the present invention.

As was noted above, the present invention employs special, permanently lubricated flanged bushings such as Garlock DU bushings, INA Permaglide bushings, or other suitable bushings having similar properties. An exemplary flanged bushing 100 of this general type is shown in FIG. 1. As can be seen, this includes a main sleeve section 102 and a radial flange section 104. Owing to the manner in which these bushings are typically constructed, the sleeve portion of the exemplary bushing 100 has a longitudinally extending joint 106 which terminates at a radial notch 108 in the flange portion 104; in pivot assemblies designed for less than 360-degree rotation, it is preferable to align the stator and rotor bushings so that these notches will not overlap during operation.

Figure 2:
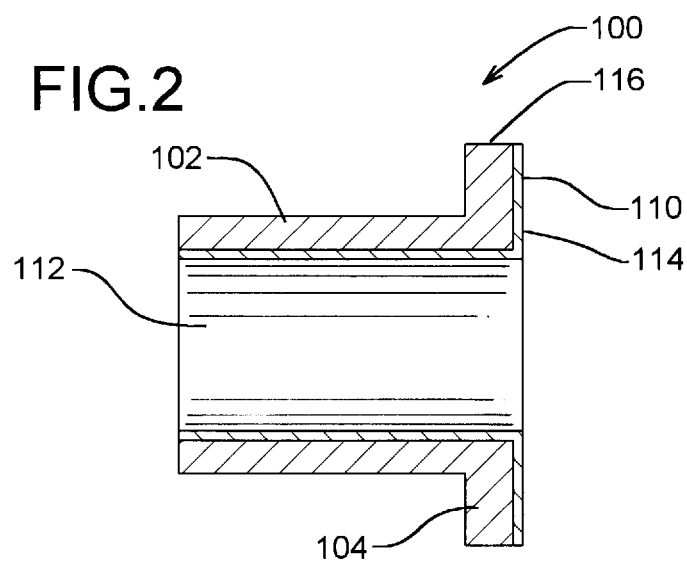
FIG. 2 is a longitudinal cross-section of the flanged bushing of FIG. 1.

A particular feature of the Garlock DU/Ina Permaglide-type bushings which pertains to the present invention is that the bearing surfaces of these bushings are provided with a permanent, lubricating wear layer 110. Although the exact makeup of the wear layer varies from manufacturer to manufacturer, a typical arrangement is a layer of porous bronze material coated with and at least partially penetrated by a top layer of lubricant material, such as an approximately one-thousandths inch layer of lead-teflon lubricant. As can be seen in FIG. 2, this wear layer 110 lines both the bore 112 of the bushing and the thrust surface 114 of the flange portion.

The wear layer 110 is permanently bonded to a harder base layer 116. Ordinarily, the wear layer 110 provides the bearing surface for the rotating part, and, owing to the somewhat "softer" nature of this material, it is this portion of the bushing which normally experiences wear/erosion during use. As will be described in greater detail below, the present invention achieves the requisite fit/preload in part by causing a partial displacement/deformation of this layer during the assembly process.

The material of which the base layer 116 is formed (e.g., steel) is not critical, although it is preferable that the compressive strength of this material be selected so that it will not be exceeded during normal operation of the pivot assembly.

c. Assembly

FIGS. 3–8 illustrate the sequential steps in the assembly of the exemplary pivot mechanism which is shown in FIG. 9A.

Figure 3:
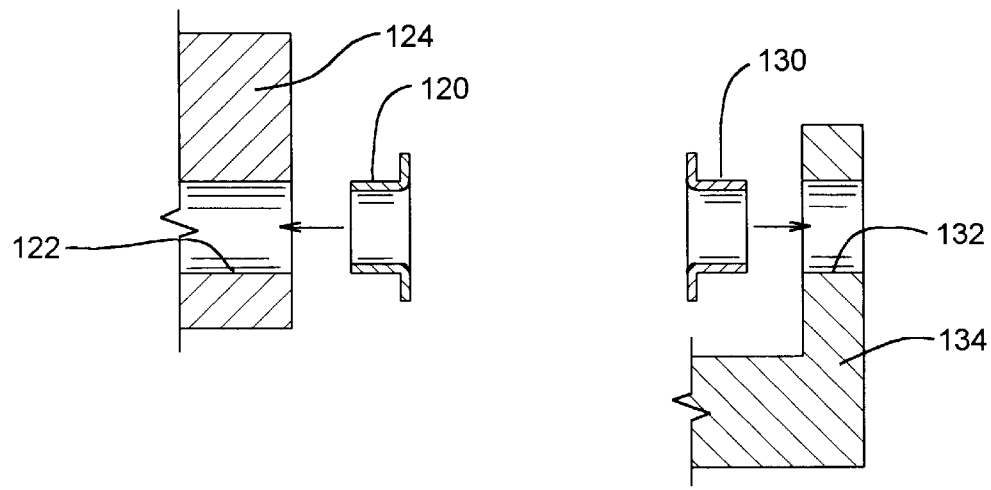
FIGS. 3–5 are cross-sectional views illustrating the installation of the permanently lubricated flanged bushings in the stationary and rotating portions of the pivot assembly, and the alignment of the pivot pin therewith.

FIG. 3 shows the stator bushing 120 aligned with bore 122 in the static part 124 of the assembly, and rotor bushing 130 aligned with bore 132 in the rotating part 134.

Figure 4:
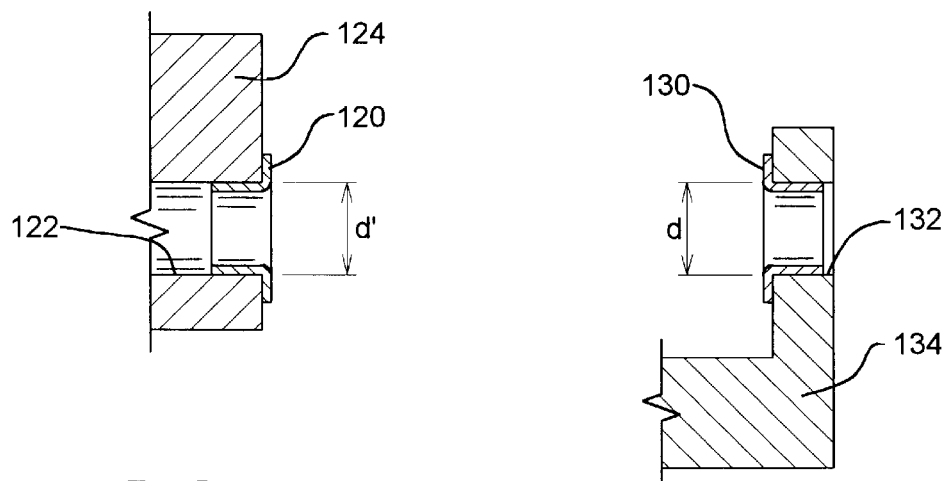

As was noted above, the inside diameter (ID) of the stator bushing 120, as assembled, is smaller than that of the rotor bushing 130. This relationship may be achieved by using stator and rotor bushings having different initial IDs, or by using the same size bushings for both and then undersizing the stator bore 122 by a greater amount than the rotor bore 132, so that the inside diameter of the stator bushing 120 will be reduced to a greater extent when its sleeve portion is forced into the smaller bore (or conversely, so that the sleeve portion of the stator bushing will not be able to cannot expand outwardly as much as that of the rotor bushing when the pivot pin is installed). In either case, as can be seen in FIG. 4, when the rotor bushing 130 is installed in its bore 132, its inside diameter (d) is larger than that (d') of the stator bushing 120.

Figure 5:
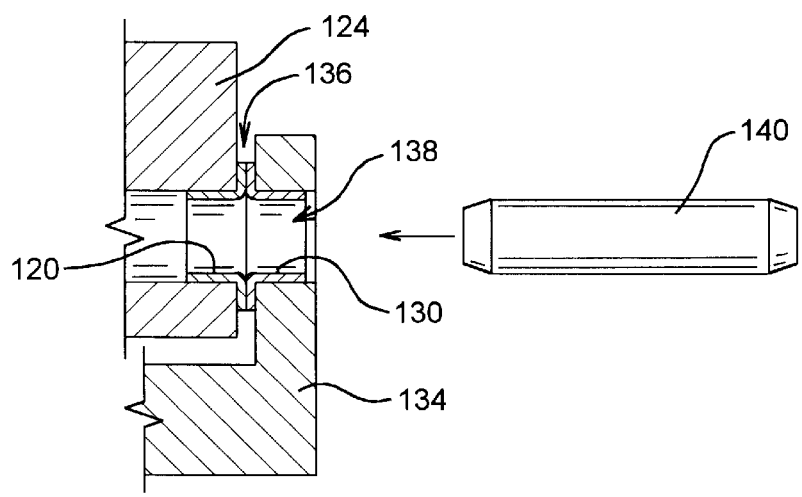

After the bushings have been installed in their respective bores, the static and rotating members of the assembly are brought together with the flange portions of the two bushings in face-to-face abutment as indicated at 136 in FIG. 5, so as to form a continuous pivot bore 138. The pivot pin 140 is then brought into alignment with the pivot bore and driven through this, as shown in FIGS. 6–7.

Figure 6:
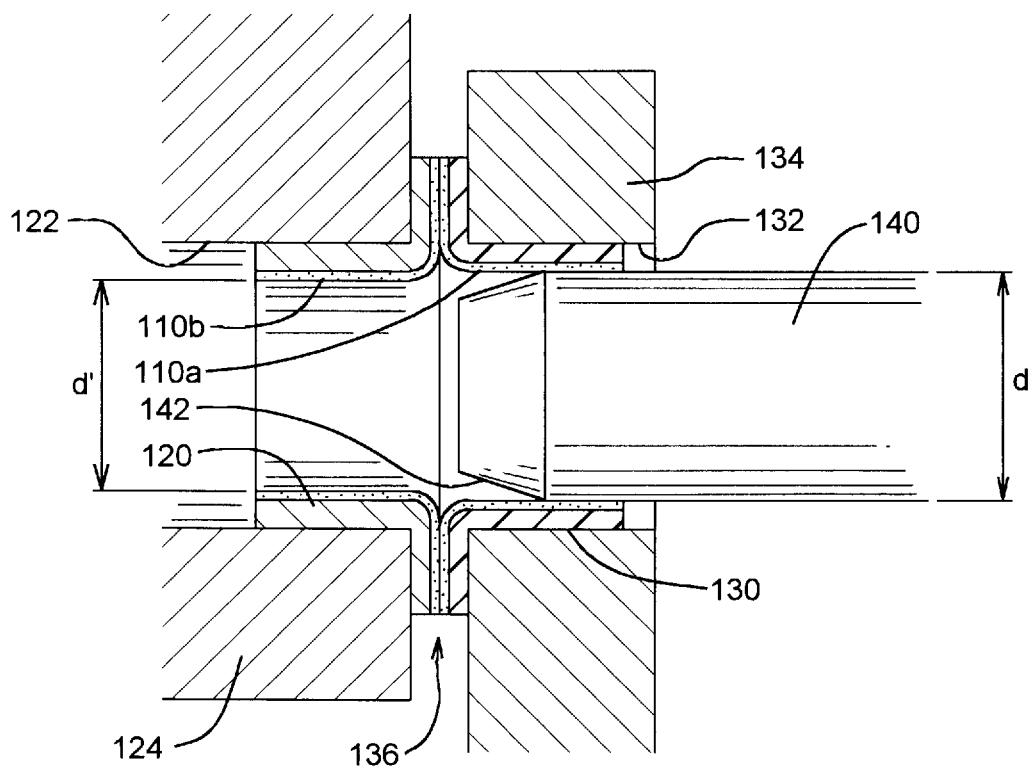
FIG. 6 is an enlarged cross-sectional view showing the installation of the pivot pin as it passes through the flanged bushing in the rotating portion of the assembly.
Figure 7:
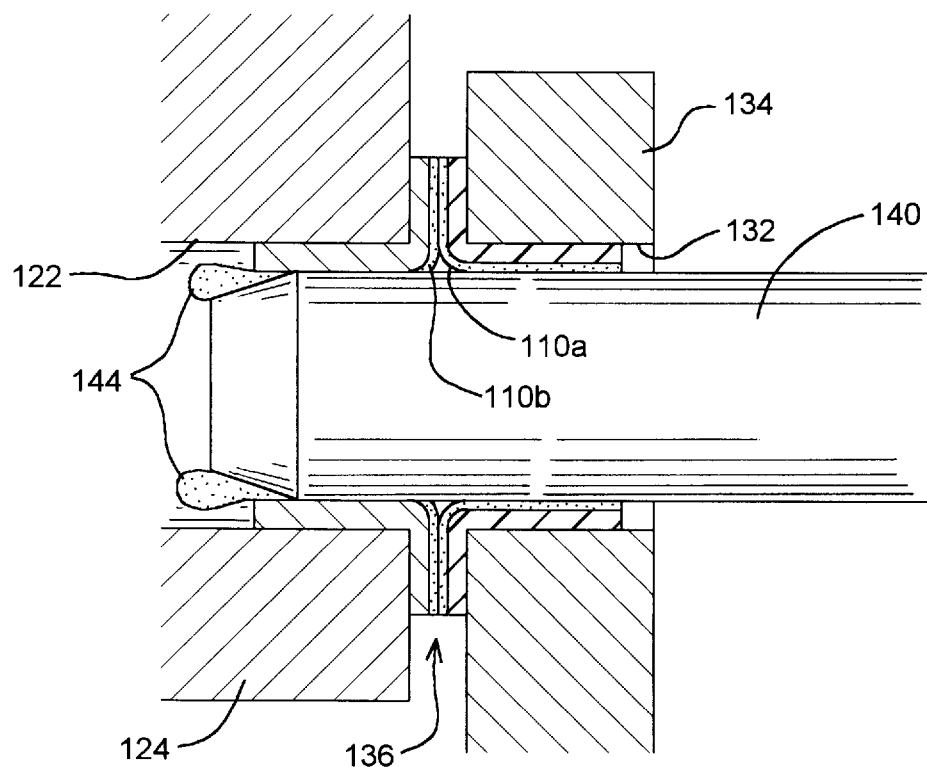
FIG. 7 is a cross-sectional view similar to FIG. 6 showing the subsequent passage of the pivot pin through the flanged bushing in the stationary party of the assembly.

In particular, FIG. 6 shows the first phase of the installation, in which the tapered lead end 142 of the pivot pin 140 passes through the sleeve of the rotor bushing 130. As was noted above, the inside diameter (d) of this bushing (as installed) is somewhat larger than that of the stator bushing, preferably so that the diameter of the rotor bushing is only slightly smaller than the diameter of the pivot pin 140. Accordingly, the wear layer 110a on the sleeve portion of this bushing remains comparatively intact as the leading end of the pivot pin passes through.

The inside diameter (d') of the stator bushing 120, however, is sized significantly smaller than the diameter of the pivot pin, preferably by an amount approximately equal to twice the thickness of the permanently lubricated wear layer 110b on the inner surface of the sleeve portion of the bushing. Accordingly, as the pivot pin 140 is driven through this, the porous bronze component of the wear layer 110b (or the corresponding component in other versions of the bushing) is compressed, and the lubricant top layer, along with a part of the porous bronze layer in some installations, is removed from inside the sleeve portion and forced out of this by the lead end of the pivot pin, as indicated at 144 the radial flanges preventing the bushings from being displaced in the bore as this is done. This forms a tight "friction fit" between the stator bushing and pivot shaft which prevents rotation of the shaft inside the static member 124 of the assembly As can be seen, the thickness of the wear layer 110b on the static bushing thus provides a degree of leeway in the installation, so that precise machining of the pivot pin 140 and bore 122 is not required in order to achieve the desired fit. However, since the pivot pin does not turn inside the stator bushing once installed, its wear characteristics are not critical. It will be understood, however, the lower the resistance of the wear layer of the stator bushing (i.e., the softer the wear layer), the easier the installation of the pin will be and the tighter the fit, resulting in even lower machining tolerance requirements for the shafts and bores and therefore easier and more economical production of the assembly.

The larger ID of the rotor bushing 130, in turn, forms a loose fit on the pivot pin, and this permits the rotating member 134 of the assembly to rotate about the pivot pin. The diameter of the pivot pin 140, however, is still slightly larger than the diameter (d) of the rotor bushing so that there is a friction engagement between the two which eliminates any unwanted "play". Thus, although the permanently lubricated wear layer of the rotor bushing is compressed or displaced to a degree to provide the "preload", this layer remains substantially intact to provide a bearing surface against the shaft.

Finally, the large face-to-face contact area between the two permanently lubricated flange portions, as indicated at 136, provides the pivot assembly with excellent lateral stability and a permanently lubricated, smooth working interface where the moving components come into contact, for long term durability.

Figure 8:
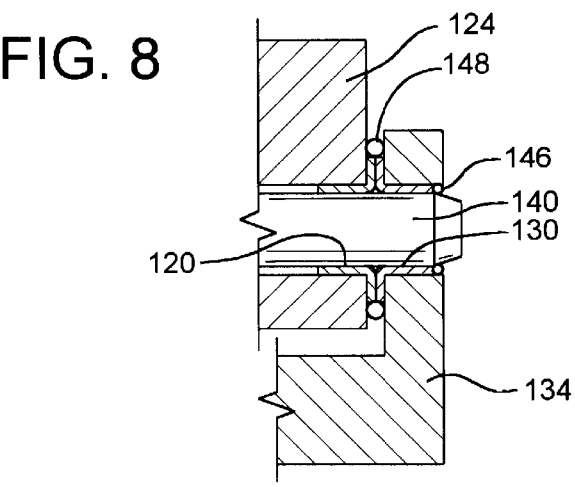
FIG. 8 is a cross-sectional view showing the installation of the pivot pin completed and O-rings installed to seal the bushing assembly.

As shown in FIG. 8, the assembly is preferably completed by the installation of O-rings 146, 148, at the outer end of the pivot pin and the abutting flange portions of the two bushings, so as to seal the assembly against the entry of dirt and water. Since the O-rings can simply be installed in the gaps formed by the sleeve and flange portions of the flanged bushings, the present invention has the additional advantages of eliminating the need for separate machining steps to form seats/retaining areas for the seals. The use of flanged bushings also eliminates the need for any machined steps or counterbores, as would be necessary to retain sleeve bushings, for example.

Figure 9B:
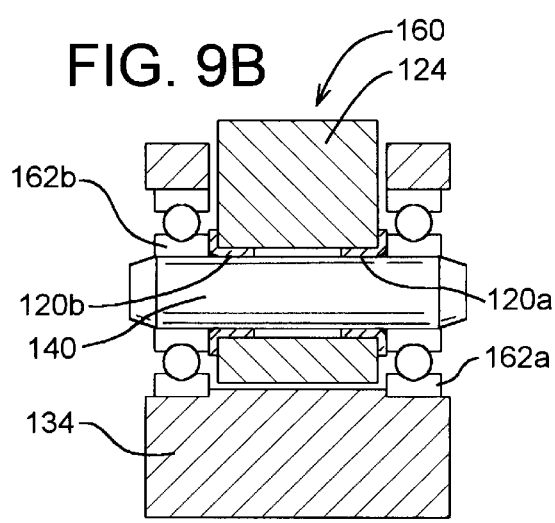
FIG. 9B is a cross-sectional view of a second embodiment of pivot assembly constructed in accordance with the present invention, in which the outer bushings are replaced by ball or roller or similar bearings.
Figure 9C:
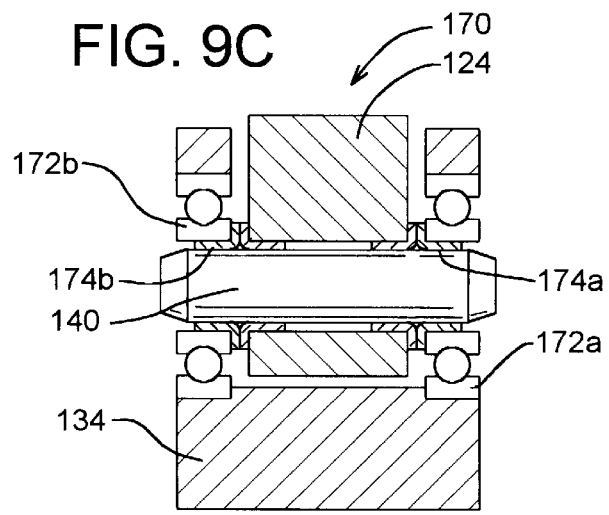
FIG. 9C is a cross-sectional view of a bearing assembly similar to FIG. 9B, but in which outer flanged bushings are installed in the ball bearing units in a manner similar to that shown in FIGS. 3–9A.

FIG. 9A shows a complete pivot assembly 150 constructed as described above, with mirror image identical bushings 120b, 130b and components on the opposite side of the assembly. FIG. 9B, in turn, shows a pivot assembly 160 in accordance with the present invention which is generally similar in construction to that described above, but in which the rotor bushings 130a, 130b at the outboard sides of the assembly have been replaced by press-fit ball or roller bearings 162a, 162b so as to provide a solid and replaceable seat for the pivot shaft 140. Finally, FIG. 9C shows an embodiment of the present invention in which the support for the rotating part 134 of the assembly is provided by a combination of ball or roller bearings 172a, 172b and flanged bushings 174a, 174b, the latter corresponding to and being substantially the same as the rotor bushings 130a, 130b described above. This particular construction permits the use of stable, low-wear ball or roller bearings, while still reducing the need for precision machining of the pivot shaft diameter. In both embodiments shown in FIGS. 9B and 9C, the configuration of the inboard stator bushings 120a, 120b remain substantially the same as described above.

It is to be recognized that various alterations, modifications, and/or additions may be introduced into the constructions and arrangements of parts described above without departing from the spirit or ambit of the present invention. Accordingly, the present invention is not to be limited except as by the appended claims.

What is claimed is:

1. A method for forming a pivot assembly, comprising the steps of:

providing first and second self-lubricating flanged bushings, each said bushing having a self-lubricating wear layer of predetermined thickness on an inner surface of a sleeve portion thereof;

installing said first self-lubricating flanged bushing in a bore in a static component of said assembly so that said sleeve portion of said first bushing defines a pivot bore having a first predetermined inside diameter;

installing said second self-lubricating flanged bushing in a bore in a rotating component of said assembly so that said sleeve portion defines a pivot bore having a second predetermined inside diameter which is sized larger than said first inside diameter of said first bushing; and driving a pivot shaft axially through said pivot bores in said first and second flanged bushings, said pivot shaft having a predetermined outside diameter which is sized larger than said inside diameter of said pivot bore in said second bushing by an amount substantially less than twice said predetermined thickness of said self-lubricating wear layer of said second bushing, so that a lead end of said pivot shaft displaces a first, relatively greater amount of said wear layer on said bore of said first flanged bushing so as to form a tight, non-rotating fit therewith, and a second, relatively smaller amount of said wear layer on said bore of said second flanged bushing so as to form a tight, rotating fit therewith.

2. The method of claim 1, further comprising the step of:

positioning said components so that said pivot bores in said bushing are in coaxial alignment and flange portions of said first and second bushings are in face-to-face engagement, said flange portions of said bushings each having a wear layer of said self-lubricating material on a face side thereof.

3. The method of claim 1, wherein the step of driving a pivot shaft axially through said bores in said flanged bushings comprises:

sizing said pivot shaft to have a diameter which is larger than said bore in said first bushing by an amount approximately equal to twice said thickness of said self-lubricating wear layer thereon, and which is larger than said bore in said second bushing by an amount equal to a fraction of said thickness of said wear layer thereon, so that said installation of said shaft displaces the majority of said wear layer on said first bushing so as to form said non-rotating fit, and said wear layer on said second bushing remains substantially intact so as to form said rotating fit with said shaft.

* * * * *